US006957437B1

(12) United States Patent
Bogia et al.

(10) Patent No.: US 6,957,437 B1
(45) Date of Patent: Oct. 18, 2005

(54) SELECTING A DEVICE DRIVER FOR A PERIPHERAL DEVICE ADAPTED TO OPERATE ON A NETWORK AND SIMPLIFYING SECONDARY PRINTER INSTALLATION

(75) Inventors: Douglas P. Bogia, Hillsboro, OR (US); Monte G. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,333

(22) Filed: Dec. 23, 1999

(51) Int. Cl.[7] ............................. G06F 3/00; G06F 9/44; G06F 9/46; G06F 13/00
(52) U.S. Cl. .......................... 719/327; 719/321; 710/10
(58) Field of Search ................................ 709/321–327, 709/310; 719/321–327; 710/8, 10

(56) References Cited

U.S. PATENT DOCUMENTS

| 5,580,177 | A | * | 12/1996 | Gase et al. | .................... 400/61 |
| 5,822,565 | A | * | 10/1998 | DeRosa, Jr. et al. | .......... 703/24 |
| 5,867,730 | A | * | 2/1999 | Leyda | ........................ 710/10 |
| 6,263,387 | B1 | * | 7/2001 | Chrabaszcz | ................. 710/302 |
| 6,301,012 | B1 | * | 10/2001 | White et al. | ................ 358/1.15 |
| 6,542,892 | B1 | * | 4/2003 | Cantwell | ...................... 707/10 |
| 6,671,749 | B2 | * | 12/2003 | Williams et al. | .............. 710/10 |

OTHER PUBLICATIONS

Thambidurai et al., Internet Printing, Aug. 1998, OKI Technical Review, vol. 64, pp. 7-10.*
Thambidurai et al, Internet Printing, OKI Technical Review, Aug. 1998, vol. 64, pp. 7-10.*
Microsoft Corporation, "Plug and Play for Windows 2000", Aug. 1999, pp. 1-11.

* cited by examiner

Primary Examiner—Meng-Al An
Assistant Examiner—Diem Ky Cao
(74) Attorney, Agent, or Firm—Pillsbury Winthrop Shaw Pittman LLP

(57) ABSTRACT

A method and system for automatically configuring a computer peripheral device connected to a computer network. The method and system both retrieve the Industry of Electrical and Electronic Engineering standard 1284 device identification stored in the peripheral device and select an appropriate device driver for installation of the device. Upon completion of an initial device driver installation, a subsequent user is provided with information pertaining to a previous installation of the driver in order to simplify a current installation of the driver.

28 Claims, 8 Drawing Sheets

IEEE 1284 data transfer modes

- Compatibility Mode ("Centronics" or standard mode) — 15
- Nibble Mode (4 bit parallel transfer - using status lines) — 16
- Byte Mode (8 bit parallel transfer - using status lines) — 17
- EPP Mode (non-printer peripherals) — 18
- ECP Mode (bi-directional, used by printers, scanners) — 19

FIG. 1

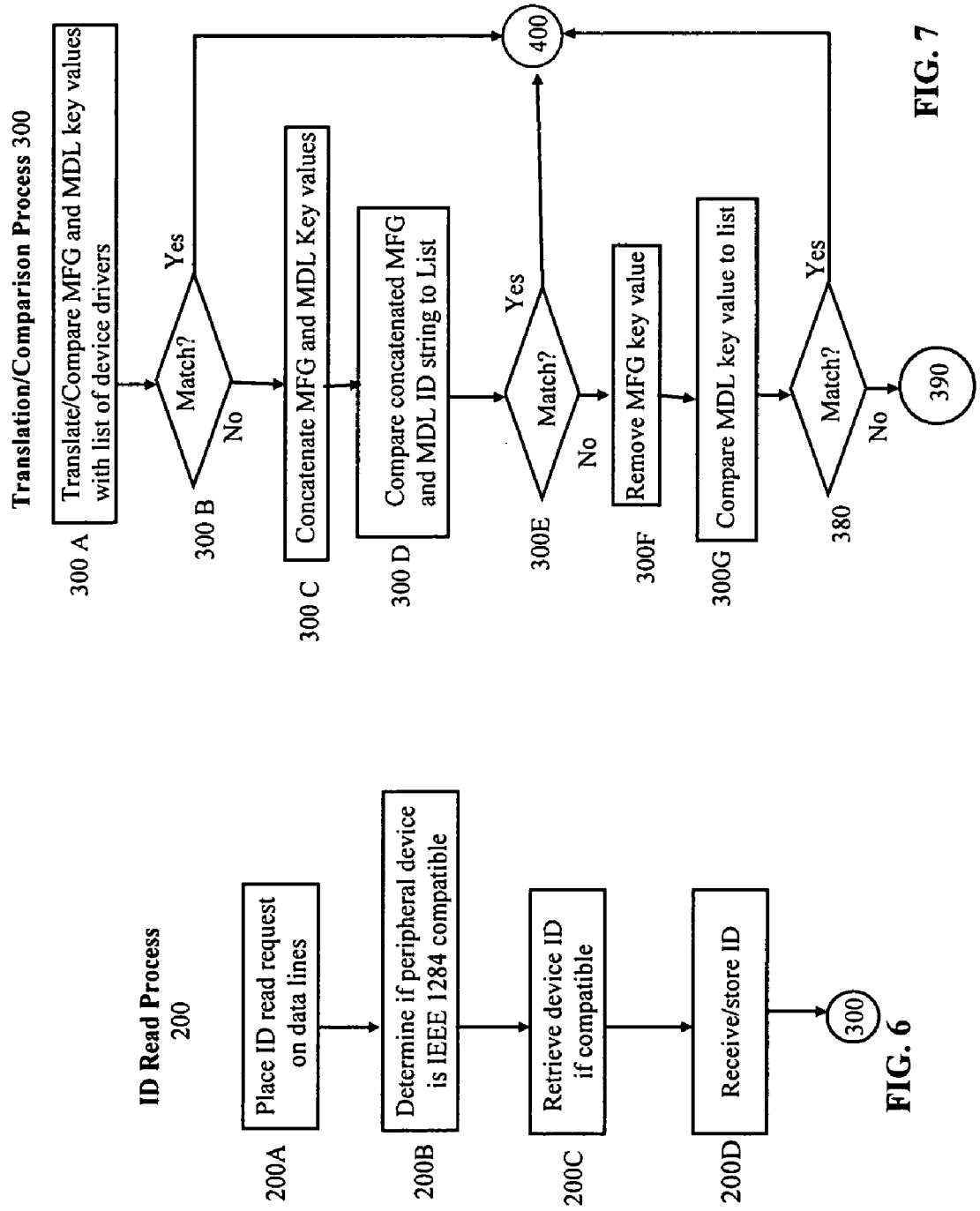

SELECTING A DEVICE DRIVER FOR A PERIPHERAL DEVICE ADAPTED TO OPERATE ON A NETWORK AND SIMPLIFYING SECONDARY PRINTER INSTALLATION

BACKGROUND OF THE INVENTION

1. Field of the Invention

This invention relates to configuring a computer for installation of a peripheral device. In particular, device drivers are selected for computer peripherals, based upon an identification code associated with the peripheral.

2. Description of the Related Art

Most personal computer (PC) systems facilitate the installation of newly connected hardware devices by first detecting that the new device has been connected to a bus of the computer. For example, the Microsoft® Windows® "Install New Hardware Wizard," may be activated by a user to assist in detecting and identifying the newly connected hardware. The Hardware Wizard recognizes newly connected hardware, and guides the user through the installation of the correct device drivers. A device driver is a software program that matches standardized commands from the computer's operating system to specific capabilities of the newly connected device. To aid in this process, Microsoft® Windows®, for example, uses a popular software routine called Plug and Play.

Plug and Play is a computer implemented routine that provides a host PC with an ability to detect the connection of new hardware, and in some cases, to automatically install the required device driver(s). Specifically, Plug and Play, implemented by the PC's operating system, identifies new hardware devices connected to the PC and presents the user with installation options. Most new PCs are Plug and Play compatible.

In order for Plug and Play to function, the new hardware device must also be Plug and Play compatible. A major component of this compatibility is the Plug and Play device's identification (ID) stored in a memory location of the newly connected hardware device. This ID is provided to the PC during a Plug and Play handshake session. Plug and Play operates by requesting that a newly connected hardware device identify itself to the PC using the ID. In response, the device transmits its device ID to the PC which is then processed and identified by the PC's operating system. The signaling standard that governs the physical and electrical exchanges between the PC and the newly connected hardware device is the IEEE Std. 1284-1994 Standard Signaling Method for a Bi-directional Parallel Peripheral Interface for Personal Computers, published Mar. 30, 1994.

The IEEE 1284 standard essentially upgrades the standard parallel port (SPP) interface that was designed for the IBM PC of the early 1980s. In particular, IEEE 1284 defines the physical and electrical interface between the PC and the peripheral device. The original SPP, referred to as the centronics style interface, provided an input/output (I/O) interface between a PC and a peripheral device at speeds on the order of 150 KBps. During this time frame, the fastest peripheral device was the dot matrix printer which could be easily accommodated by the SPP. The centronics style SPP, however, was unable to accommodate the much faster peripheral devices of modern personal computing, such as laser printers, which transfer color graphic files of sizes on the order of megabytes. An additional short-coming of the earlier parallel ports was the limitation of being able to transfer information in one direction only. Therefore, in the mid-1990s, the IEEE Standards Board approved the IEEE 1284 signaling method.

IEEE 1284 parallel ports run at 100 to 200 times faster than the original centronics-style parallel ports and not only facilitate faster communication, but also facilitate bi-directional communication, allowing the printer to not only receive data, but also talk back to the PC. Today, most printer manufacturers design their newer generation printers to support the IEEE 1284 signaling standard. The device drivers that accompany these machines take full advantage of the high speed data rates and the bi-directional capability provided by IEEE 1284.

As shown in FIG. 1, IEEE 1284 defines five modes 15–19 of data transfer. The original centronics SPP included 17 signal lines and 8 ground lines. The signal lines included control lines for providing interface control, status lines for providing status indications for things such a paper empty signals, and data lines used to transfer data between the PC and the peripheral. IEEE 1284 uses these same data lines but redefines the electrical characteristics and signaling protocol required for communication. The first three data transfer modes of IEEE 1284, the compatibility mode 15, nibble mode 16, and byte mode 17, are provided mainly to support older uni-directional devices that continue to operate at the slower speeds. The Enhanced Parallel Port (EPP) mode 18 and Extended Capability Port (ECP) 19, facilitate operation of more modern, faster peripheral devices. EPP mode primarily supports CD ROMs, hard drives, and other non-printer peripherals and ECP mode is mainly directed towards printers and scanners. Microsoft® Windows® 95, for example, supports each of the five IEEE 1284 data transfer modes in its Plug and Play routine.

IEEE 1284 also defines the requirements of the device ID used, for example, in the Plug and Play implementation. As addressed above, the device ID is requested from the new hardware device by the PC in order for the PC to be able to properly identify and install the device drivers necessary for the new hardware to function correctly. In accordance with IEEE 1284, the device ID includes specific case sensitive key values. These values includes fields such as MANUFACTURER, and MODEL which are abbreviated by IEEE 1284 as MFG, and MDL respectively. The MFG identifies the device manufacturer, and MDL provides a specific model number or nomenclature. Other Key fields exist, such as CLASS (CLS) and DESCRIPTION (DES), but are not as widely used. All ID key values must consist of American Standard Code for Information Interchange (ASCII) values of 32-127 (20 h–7 Fh) and are stored in the newly connected peripheral's configuration memory, such as ROM, or EEPROM, and stored in the form of an INF file. INF files typically contain all the data and information necessary to configure and operate the respective device.

With Plug and Play implemented, a user is then able to implement routines such as the Microsoft® Install New Hardware Wizard, and navigate through the procedures required for the user to complete installation of the device. The problem is, however, that Plug and Play is not adequate to handle installation of all devices in all scenarios. One of the scenarios where Plug and Play is least helpful is installing shared printers in a networked PC environment. Specifically, Plug and Play will not identify, for example, a new printer added to a print server operating in a Novell computer network environment.

Additionally, Plug and Play cannot presently apriorily determine whether a particular device installation will be problematic and thus cannot inform the user of any special measures necessary to resolve these problems in order to properly install the new hardware device. Therefore, a different technique is needed to resolve these types of problems and thus provide a user with the ability to successfully complete installation of a printer in a networked PC environment.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the invention.

FIG. 1 is a chart illustrating each of the modes of IEEE Std. 1284.

FIG. 6 is a flow chart of the ID read process of FIG. 5.

FIG. 7 is a flow chart of the translation/comparison process of FIG. 5.

DETAILED DESCRIPTION

An embodiment of the present application retrieves an IEEE 1284 device ID from any peripheral device that supports the IEEE 1284 signaling standard. It extracts manufacturer and model information from the device ID stored e.g., in a printer, and translates it into the manufacturer and model name used by the Microsoft® Windows® operating system, for example, in its printer selection process. The manufacturer and model names are then used in order to select the proper software driver required to complete the installation of the new hardware device.

Figure 2:
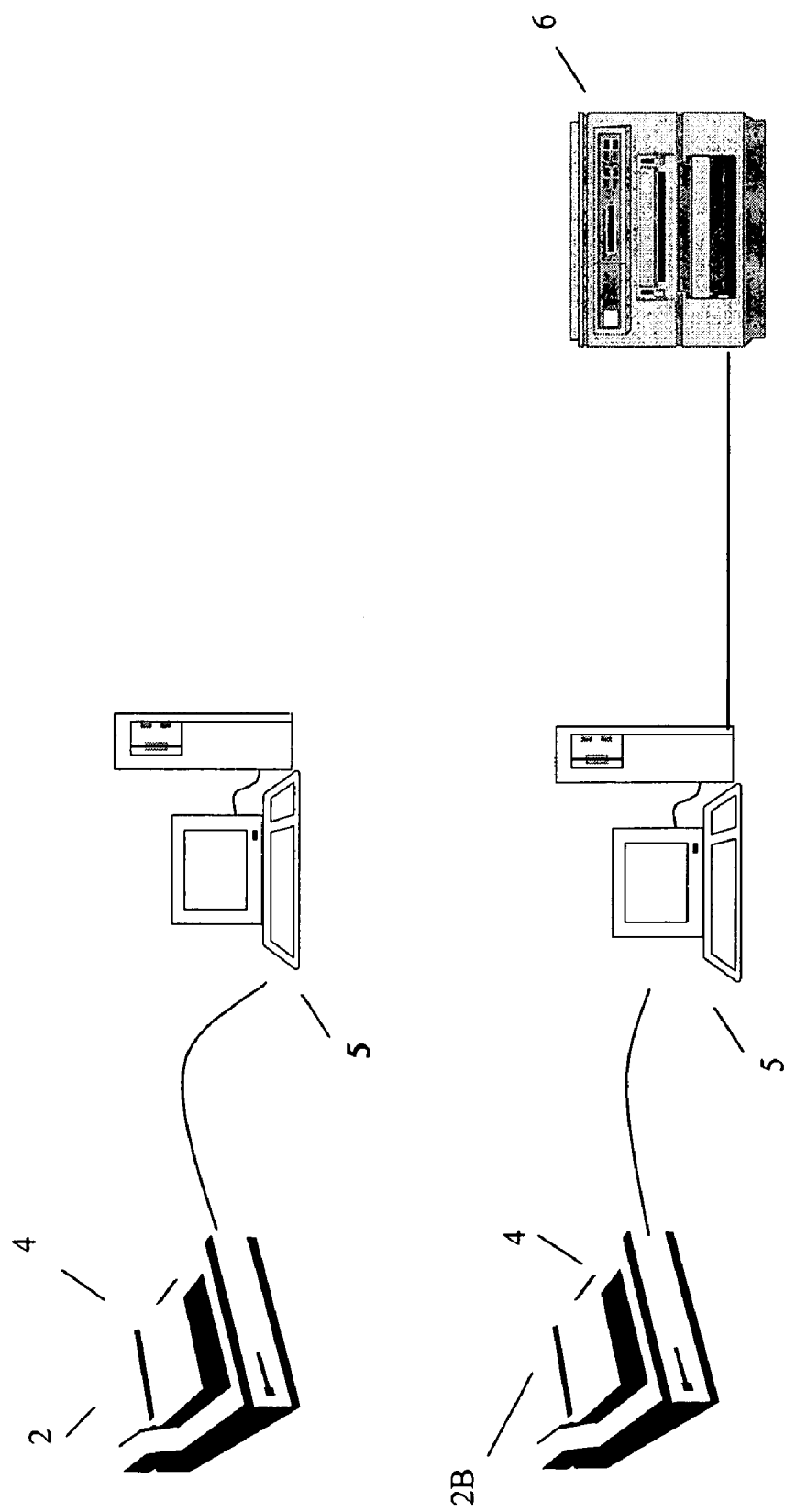
FIG. 2 is a diagram of an exemplary PC with a scanner and printer attached.

In FIG. 2, a PC workstation 2 includes a stand-alone PC 5 with a peripheral device attached, such as a scanner 4. If a user desires to attach a printer 6 to the PC 5, workstation 2B is created. In order to successfully connect the printer 6, an operating system used by the processor of the PC 5 may use a routine such as the Microsoft® Install New Hardware Wizard, previously described.

A user would initiate installation by first connecting the new hardware and then activating the Hardware Wizard routine. The routine would assist the user in identifying the newly connected printer 6, and provide the user with a list of potentially matching drivers from which to choose. A processor of the PC 5 would attempt to match the device ID of printer 6 to a list of device drivers stored in its own memory. If a match occurs, the device driver will be selected in order to facilitate installation. If no match is found, the user is then permitted to either provide a diskette containing the proper device driver, or select a driver from the list of drivers.

Figure 3:
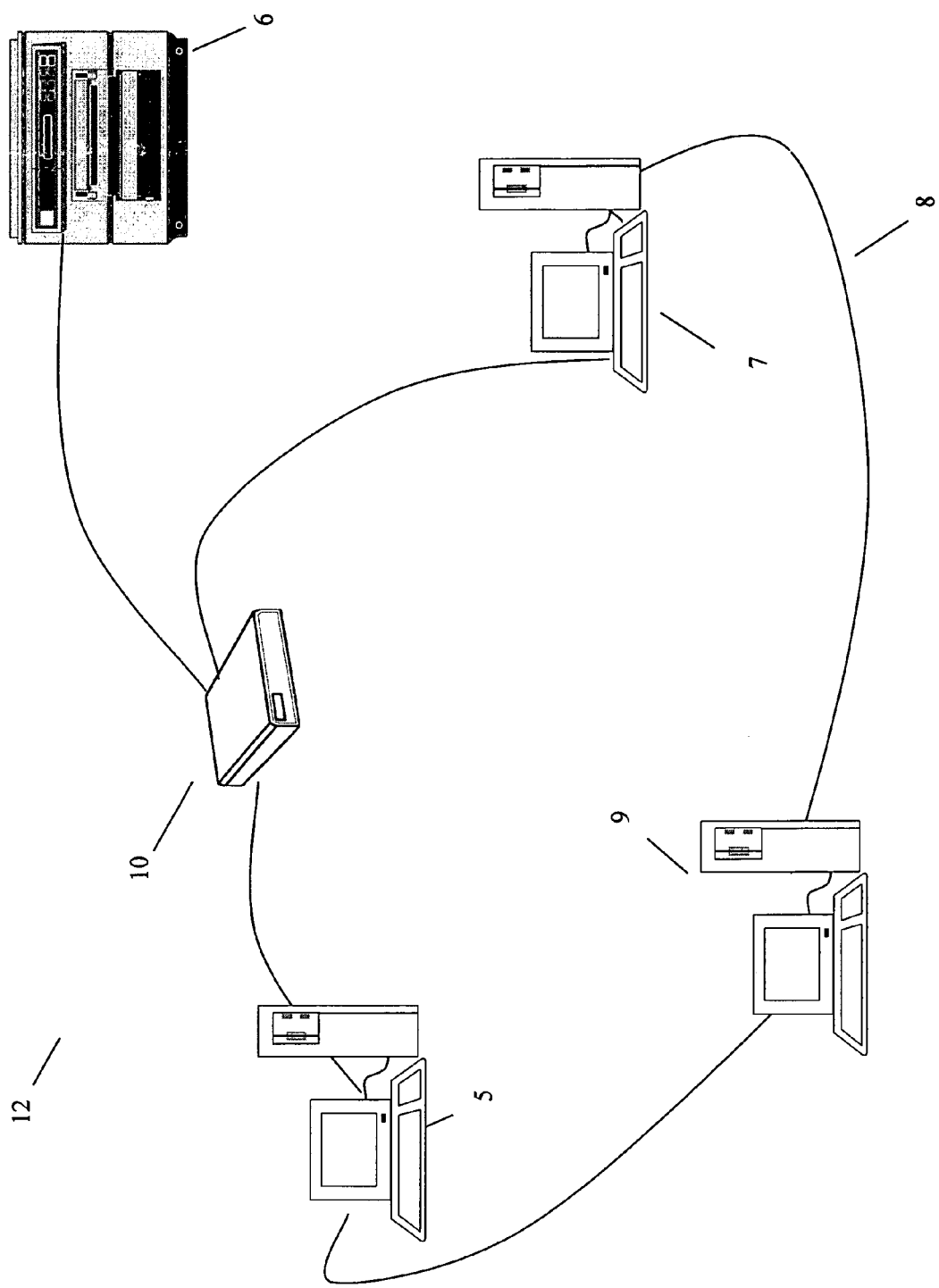
FIG. 3 is a diagram of the PC of FIG. 2 networked with other PCs.
Figure 4:
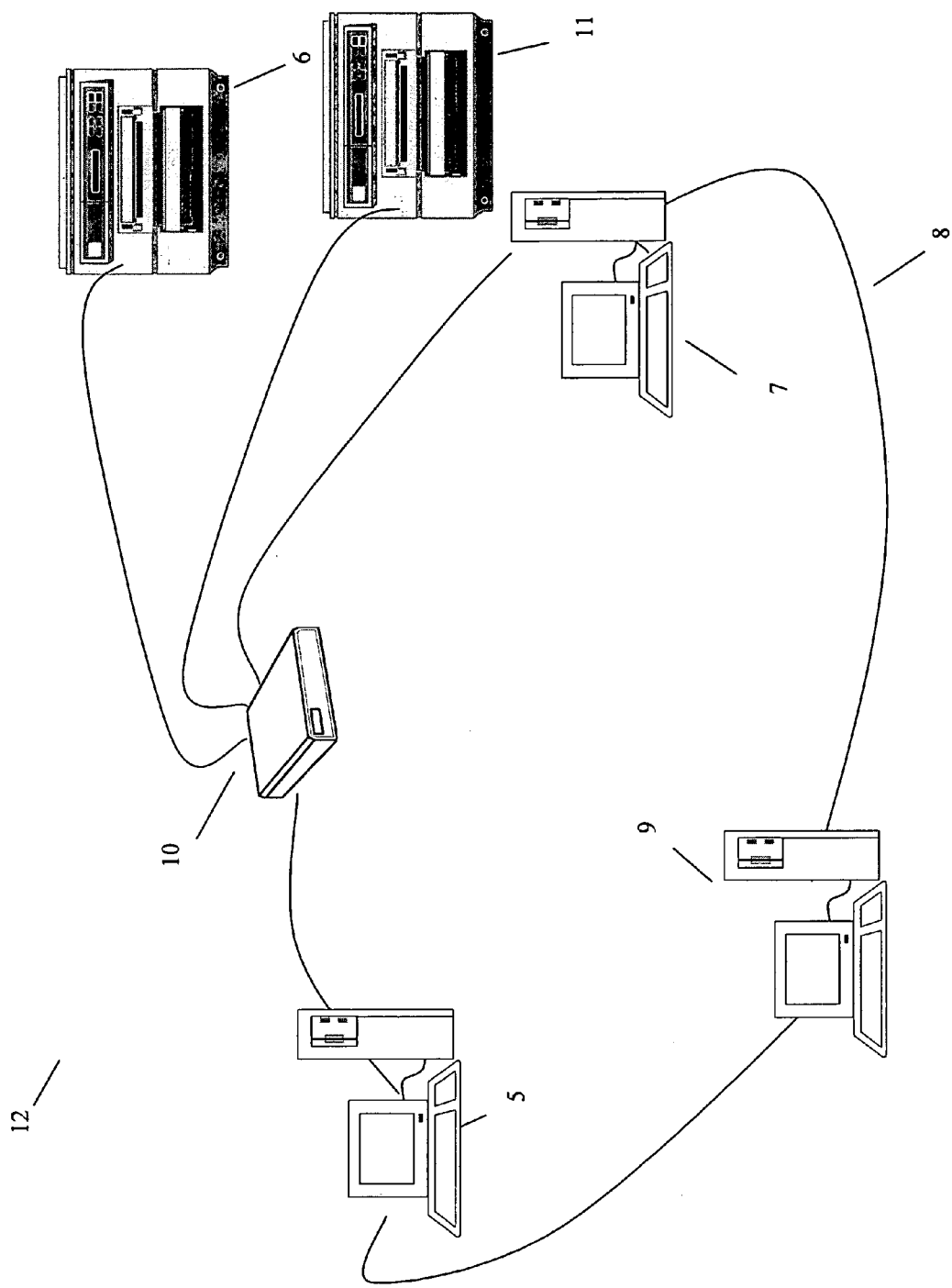
FIG. 4 is a diagram of the PC of FIG. 2 networked with other PCs and an additional printer.

In FIG. 3, for example, PCs 5, 7, and 9 are connected to one another using a connection medium 8 to form a computer network 12. A printer server 10 is also connected to the network for the purpose of allocating the use of printer 6 between each of the PCs 5, 7, and 9. In this arrangement, the printer 6 is not directly attached to a PC but is attached to the print server 10 instead. In the configuration of FIG. 3, if the user desires to add an additional printer 11, as shown in FIG. 4, the Hardware Wizard cannot be used by the PC 5 user to install the additional printer 11. This routine cannot be used because, as stated earlier, printer 6 is not attached directly to a PC but is attached instead, to the print server 10. Similarly, new printer 11 is also be connected to the print server 10. Since the Hardware Wizard, Plug and Play, and other similar routines, are designed for stand alone PC operation, none of the PCs 5, 7, or 9, would be able to detect and select the proper driver for installation of newly added printer 11. In short, the print server 10 would not be able to automatically select a driver for the newly added printer 11 without the aid of some other device or method.

Figure 5:
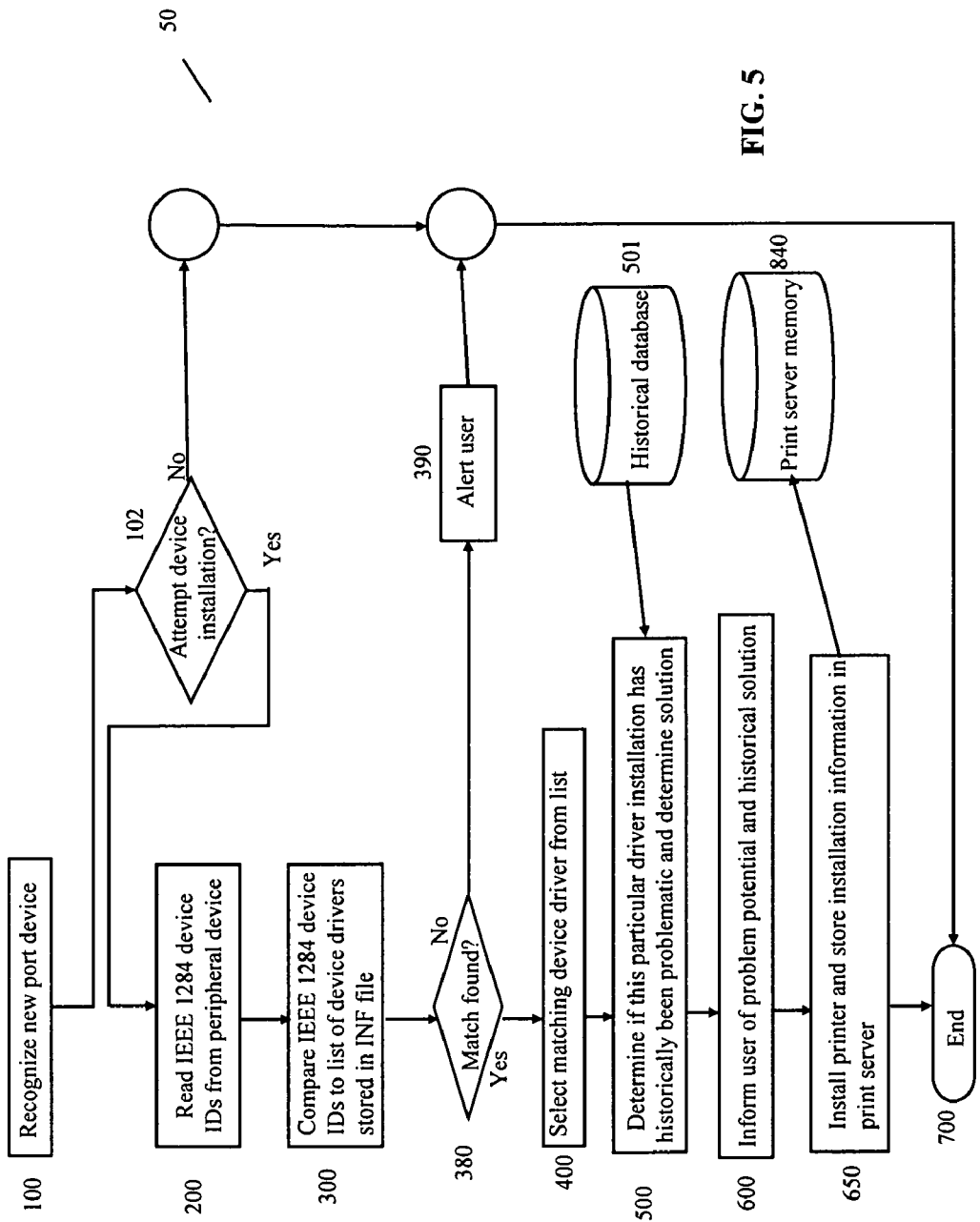
FIG. 5 is a flow chart describing an exemplary method of implementing the present invention.

By providing, for example, the print server 10 and the PC 5, of FIG. 4, with an exemplary embodiment of the present invention, such as illustrated in selection/installation process 50 of FIG. 5, the user would be able to connect new hardware to the computer network 12 and be able to install the necessary drivers. The user is also informed, beforehand, whether a particular installation will present problems. Thus, by using the aforementioned exemplary embodiment of the present invention, the user can automatically select a device driver, such as a printer driver required for printer 11, and resolve these potential installation problems.

In FIG. 5, the operating system of PC 5 along with the present invention 50, would first recognize 100 that a new device has been installed on the output port of the print server 10. The user would then be prompted as to whether installation of the new device should be attempted 102. If installation is desired, the routine, partially stored in a memory of PC 5 and print server 10, would proceed to read 200 the IEEE 1284 device ID from the newly connected device, e.g., printer 11. If device installation is not desired, the process would tterminate 700.

In order for the print server 10 to read the IEEE 1284 device ID from a newly added peripheral, such as printer 11, the print server 10 must first transmit a read request 200A data signal, as shown in FIG. 6. Transmission of this signal will ultimately determine whether the printer 11 is IEEE 1284 compatible 200B. If compatibility is confirmed, the printer's device ID is retrieved 200C and stored in an appropriate memory location.

As addressed earlier, the device ID may be found in the memory of printer 11 as a string of ASCII characters between the values of 20 h–7 Fh, and may comprise key values such as MFG, MDL, CLS, and DES. The idea of the present invention is that the ID string, comprising at least the MFG and MDL key values, may be manipulated in a number of different ways to assist in identification of the drivers of a shared peripheral. However, in the exemplary embodiment illustrated in FIG. 5, not all of the key values are used by selection/installation process 50.

Figure 8:
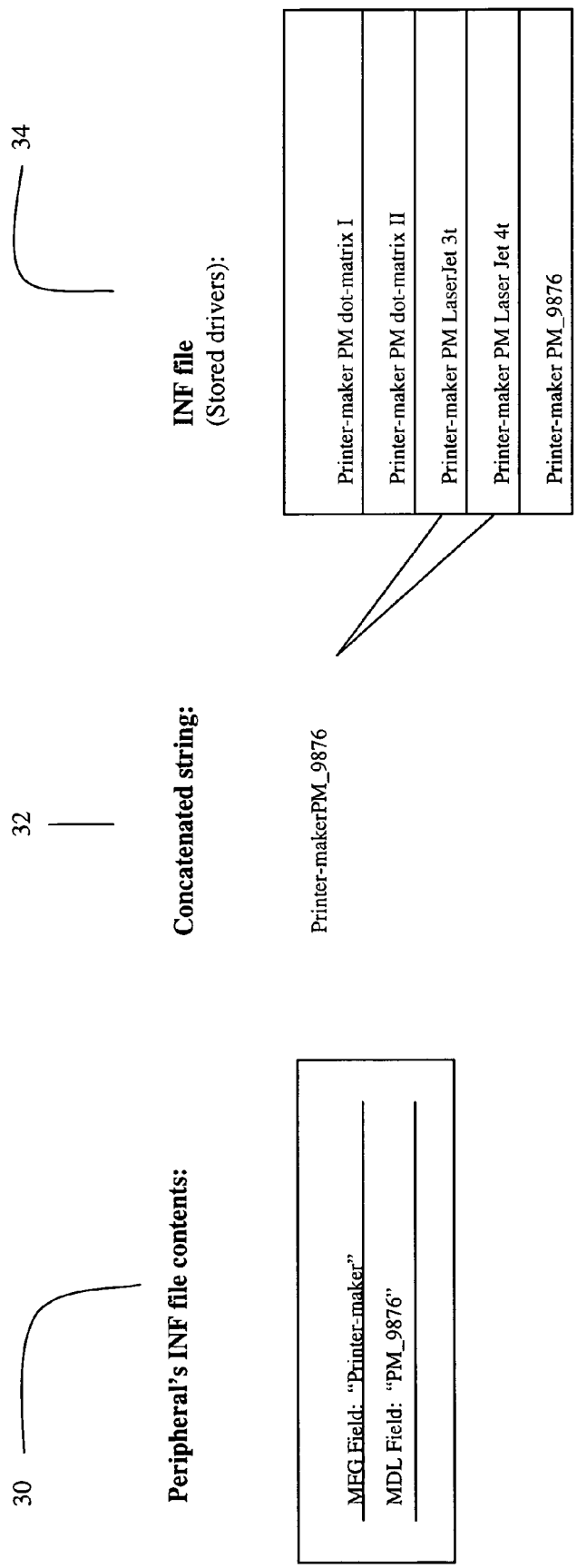
FIG. 8 is an illustration of exemplary contents of a peripheral device's INF file, an example of a concatenated ID string, and an example of a host device's INF file contents.

When these fields are received and stored 200D, the routine 50 will then attempt to compare 300 the ID to a list of device drivers stored in an INF file of the PC 5. The invention may be implemented by manipulating any of the IEEE 1284 ID key fields and comparing these manipulated fields with stored device data. However, as shown in FIG. 7, the MFG and MDL key values are the primary key values used. First, upon retrieval, the MFG and MDL values are directly compared 300A with device names on a list of device drivers stored in PC 5. If a match 300B is found, the matching driver is selected 400. On the other hand if the comparison between the MFG and MDL key values with the listed names does not produce a match, the MFG and MDL key values are concatenated 300C, i.e., they are combined to form an ID string. The concatenated ID string is then compared 300D to the same list of drivers. Again, if a match 300E is found, the matching driver is selected 400. If a match 300E is not found, the MFG key value is then removed 300F, leaving the MDL as the remaining key value in the ID string. Finally, the MDL key value is compared with the list 300G in order to find a match 380. If a match 380 is found, the matching driver is selected. However, at this point, if a match is not found, the process will not be able to automatically select the appropriate driver. The translations that occur at 300C and 300F are necessary because the device ID codes, as stored in the printer 11, do not map directly into the device ID display strings associated with the device drivers. For example, FIG. 8 illustrates the manner in which typical MFG and MDL codes would appear in a file 30 stored in a memory of the printer 11. The MFG field may contain the value "printer-maker" minus the quotes to denote the manufacturer of the printer, as shown in FIG. 8. The MDL field may contain the value "PM Laserjet 3T" minus the quotes, to denote the specific model of the printer.

In the example of FIG. 8, after the MFG and MDL key fields have been retrieved and compared 300 with the list of drivers, the selection/installation process 50 will then concatenate the two key values 300B, producing "printer-makerPM_9876, 32." This value is then compared to names on the list of drivers stored in a file 34 of the user's PC. Although the MFG and MDL fields are utilized in the present invention, it is possible, as stated above, that other key field values may be used to create the device ID, such as a compatibility (CID) key field. The CID key field informs a Microsoft® Windows®(D based processor if the peripheral device will emulate other devices. When a match is finally achieved, a device driver is selected 400.

Again referring to FIG. 5, after selection of the device driver, the installation/selection routine 50 would determine if the particular peripheral device and the corresponding selected driver have historically created installation problems 500 for users. This feature is implemented by compiling known information into a data file, storing the information in database 501 in the print server 10, and making this information available to users. The selected driver is then compared with the database 501 to determine if the present installation is even possible, and/or determine if historical problems exist with respect to this particular installation. For example, some printers are considered to be host-based devices. That is, in order for these printers to initially be set-up for use, for example to have the printer heads properly configured and the printer's ink flow adjusted, they must be first attached to a local PC. A user would not be able connect such a host-based printer to a network without having first configured the printer by connecting it to a host PC. Additionally, some printers will simply not work unless they are connected directly to a host workstation. This type of information is particularly helpful to prevent the user from wasting time trying to accomplish device installations that will be problematic at best, if not impossible. This type of information is stored in database 501. Finally, the information is presented to the user along with information required to resolve the installation problems 600, so that the device driver can be properly installed. The user is now able to install 650 the device driver and store information related to the particular installation in a memory of the print server 840. This process ends at 700 after the correct driver has been selected with the user able to install the selected driver in the PC 5.

Figure 9:
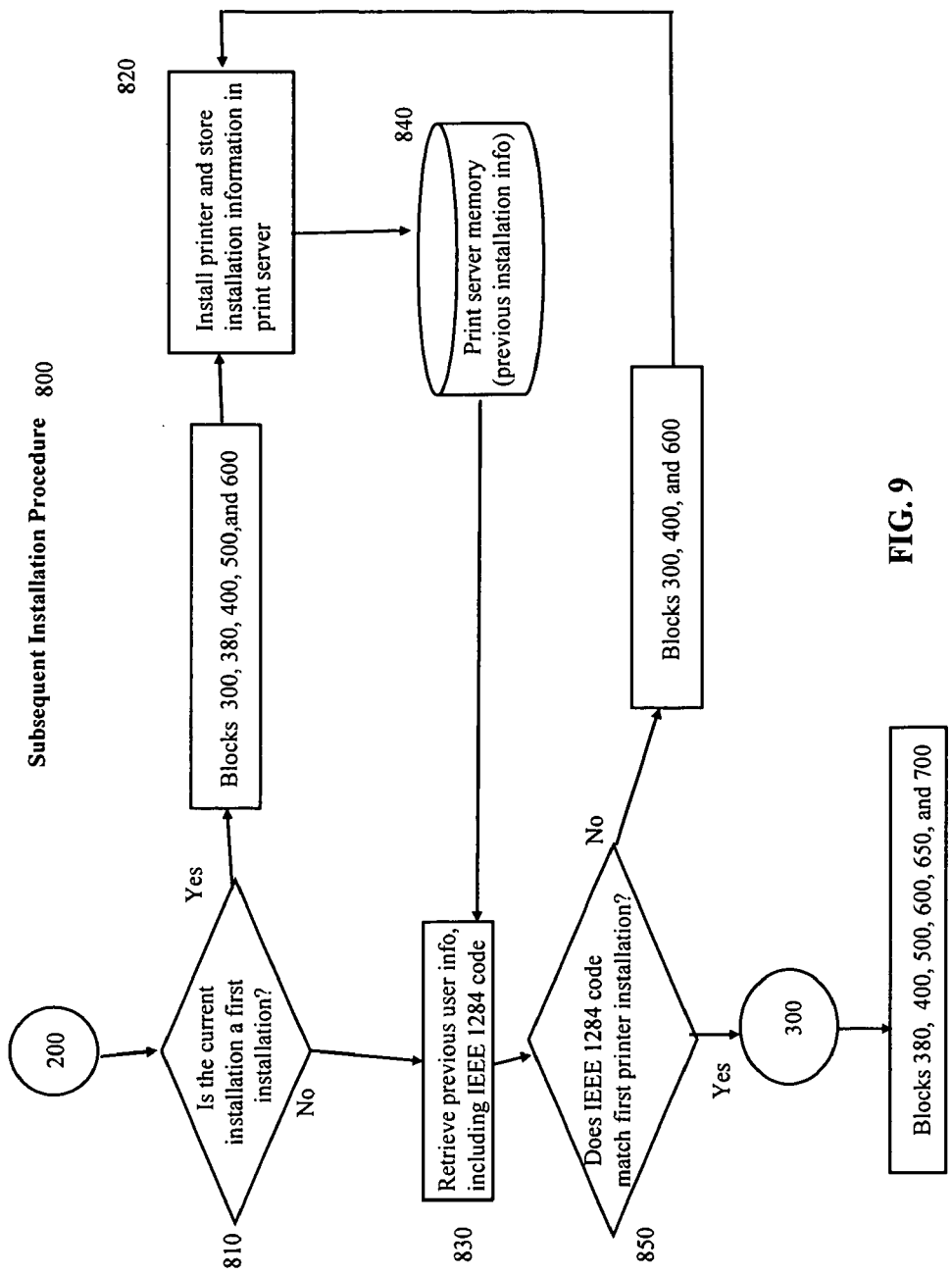
FIG. 9 is a flow chart of the process of installing a previously installed printer at a different workstation.

In another embodiment of the present invention, subsequent users of workstations connected to network 12 may also desire to configure their PC 5 for installation of the newly connected printer 11. These users may benefit from previous installation information 840 of the routine 800, illustrated in FIG. 9. This information is stored after the first installation of a newly connected printer associated with print server 10 and network 12. That is, all the steps and information taken by the user that first installed printer 11, can be made available to all subsequent network users desiring to also install the proper device drivers in their PC in order to print to the same printer 11. Included, is information such as the specific driver(s) selected, the reference name of the printer, as well as other relevant information. Since this information is available to the user, the remainder of the installation process, for this particular user, can be simplified. Simplification is necessary because sometimes the 1284 codes are incomplete or inaccurate.

To implement the process, the routine 800, would first read the 1284 device IDs from the peripheral device, as executed in block 200 of FIG. 5. Next, it is determined 810, based upon the ID, whether a current desired installation is the first installation of the printer 11 involving the particular port of print server 10. If the current installation is the first time printer 11 has been installed at this particular port of the print server 10, i.e. the first installation, the process executes blocks 300, 380, 400, 500, and 600 from FIG. 5. This series of executed functions permit the user to install 820 printer 11 and store pertinent information, relating to this installation, in a memory of the print server 840. On the other hand, if the current installation is not the first installation, i.e., this is not the first time printer 11 has been installed at the port of print server 10, the user will be presented with the information that was used to install the printer 11 during the earlier installation 830. This information is retrieved from a memory 840 of the print server 10.

In order to verify that printer 11 was indeed previously installed and not some other device, the IEEE 1284 ID of the previous installation, is retrieved from the stored information 840. If the IEEE 1284 ID of the current installation matches the ID of the earlier installation 850, confirmation is established that the current printer 11 was the device previously installed at the particular port of print server 10. In this case, the benefit of the previous user information, retrieved at 830, is used and installation of the printer 11 is completed by executing block 380 of process 50 and continuing. However, if the comparison of the IEEE 1284 IDs 850, did not produce a match, installation of the drivers would be completed based upon steps 400–600 of FIG. 5. If the IEEE 1284 IDs did not match, this would be an indication that the printer 11, had been changed since the previous installation of the device driver drivers. The user would then be permitted to select and install the required printer (driver) and then store relevant installation information in the database 840. This stored information is in-turn, made available to subsequent users.

The advantage of this process is that once one workstation has been configured to print to a particular printer, other users of workstations in the same office, connected to the network 12, will have simplified set-up procedures, based upon the information of the earlier installation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of configuring a computer for installation of a peripheral device, the method comprising:
   preparing a print server to retrieve a first device identification from a memory of the peripheral device, the print server, the peripheral device, and the computer being connected via a computer network, wherein the print server is directly connected to the computer, and the peripheral device is indirectly connected to the computer;
   comparing the first device identification to device names on a list of names associated with device drivers, the list and the drivers being stored in a memory of the computer;
   selecting for use an associated device driver if the first device identification matches one of the names, wherein at least a portion of a routine for the preparing, comparing, and selecting operations is stored in a memory of the computer, and at least a portion of the routine for the preparing, comparing, and selecting operations is stored in a memory of the print server;
   determining whether the peripheral device and the corresponding selected device driver have a previously identified installation problem using historical information stored in a database of the print server;
   retrieving countermeasure information required to resolve the identified installation problem from the database; and
   providing the countermeasure information to a user to enable installation of the selected device driver.

2. A method according to claim 1 further comprising:
   translating the first device identification into at least a second device identification if the first device identification does not match one of the names;
   comparing the at least second device identification to the device names; and
   selecting a driver from the list if the at least second device identification matches one of the names.

3. A method according to claim 2 further comprising alerting a user if the second device identification does not match one of the names.

4. A method according to claim 2 wherein the device identifications conform to an IEEE 1284 signaling standard.

5. A method according to claim 4 wherein the first device identification includes at least manufacturer and model key values.

6. A method according to claim 5 wherein the translating includes a database look-up using alternate names and key values.

7. A method according to claim 5 wherein the translating includes concatenating the manufacturer and model key values.

8. A method according to claim 5 wherein the translating further includes removing the manufacturer key value.

9. A method according to claim 4 wherein the first device identification includes a compatibility identification key field.

10. A method according to claim 2 wherein the translating includes a database look-up.

11. A method according to claim 1 wherein the peripheral device is a printer.

12. A method according to claim 1 wherein the computer network is compatible with the Microsoft® Windows® Operating System.

13. A method according to claim 1 wherein the selecting occurs automatically.

14. A system comprising:
   a computer network including a number of computer devices connected thereto, the computer devices including a print server, a computer, and at least one printer, wherein the print server is directly connected to the computer, and the at least one printer is indirectly connected to the computer, wherein a memory in the at least one printer stores a first printer identification data string, and a processor associated with the computer includes (i) a comparator for comparing the first data string to a device name on a list of device drivers stored in a memory of the computer indirectly connected to the at least one printer via the computer network, and (ii) a selector selecting a device driver from the list if the first identification data string matches one of the names, wherein at least a portion of a routine for the comparing and selecting operations is stored in a memory of the computer, and at least a portion of the routine for the comparing and selecting operations is stored in a memory of the print server, and the processor determines whether the at least one printer and the corresponding selected device driver have a previously identified installation problem using historical information stored in a database of the print server, and retrieves countermeasure information required to resolve the identified installation problem from the database, and provides the countermeasure information to a user to enable installation of the selected device driver.

15. The system according to claim 14, further comprising:
    a translator translating the first identification data string into at least a second identification data string if the first identification data string does not match one of the names;
    wherein the comparator compares the at least second identification data string to the device names and the selector selects a driver from the list if the at least second identification data string matches one of the names.

16. The system according to claim 15, further comprising:
    an alerting mechanism for alerting a user if the second identification data string does not match one of the names.

17. The system according to claim 15 wherein the device identification strings conform to an IEEE 1284 signaling standard.

18. The system according to claim 17 wherein the first device identification data string includes at least manufacturer and model key values.

19. The system according to claim 18 wherein the translator concatenates the manufacturer and model key values.

20. The system according to claim 19 wherein the translator removes the manufacturer key value from the identification data string.

21. The system according to claim 17 wherein the translator searches a database and uses alternate key values.

22. The system according to claim 17 wherein the identification string includes a compatibility identification key value.

23. The system according to claim 15 wherein the translator searches a database.

24. The system according to claim 14 wherein the computer network is compatible with the Microsoft® Windows® Operating System.

25. A method of installing printer drivers in a plurality of computers of a computer system, the computer system also including a printer and a print server, the plurality of computers, the printer, and the print server being connected via a computer network, wherein the print server is directly connected to the plurality of computers, and the printer is indirectly connected to the plurality of computers, the method comprising:

installing at least one of the printer drivers in a first computer during a first installation and storing information associated with the first installation in a memory of the print server;

retrieving information associated with the first installation from the memory during a second installation, the information associated with the first installation including a first identification data string;

retrieving a current identification data string from a memory of the printer indirectly connected to the plurality of computers via the computer network, the current identification data string being associated with the second installation;

comparing the first identification data string with the current identification data string;

determining whether the printer and at least one of the printer drivers have a previously identified installation problem using historical information stored in a database in the print server;

retrieving countermeasure information required to resolve the identified installation problem from the database; and installing at least one of the printer drivers in a second computer based upon the information associated with the first installation and the countermeasure information, wherein at least a portion of a routine for the preparing, comparing, and installing operations is stored in each memory of the plurality of computers, and at least a portion of the routine for the preparing, comparing, and installing operations is stored in a memory of the print server.

26. A method according to claim 25 further comprising installing the printer drivers in the computer if the first identification data string does not match the current identification data string and storing information associated with the installing, when the first identification data string does not match the current identification data string, in the memory of the print server.

27. A method according to claim 25 wherein the first and current data strings are IEEE 1284 ID data strings.

28. An article of manufacture comprising a machine readable medium having recorded thereon instructions, the article of manufacture being stored within a computer, such that when the instructions are executed, the instructions cause a computer processor to:

transmit instructions to a print server to prepare the print server to retrieve a first device identification from a memory of a peripheral device connected to the print server, the print sever, the peripheral device, and the computer being connected via a computer network, wherein the print server is directly connected to the computer, and the peripheral device is indirectly connected to the computer;

compare the first device identification to device names on a list of names associated with device drivers, the list stored in a memory of the computer indirectly connected to the peripheral device via the computer network;

select for use an associated device driver from the list if the first device identification matches one of the names;

determine whether the peripheral device and the corresponding selected device driver have a previously identified installation problem using historical information stored in a database;

retrieve countermeasure information required to resolve the identified installation problem from the database; and provide the countermeasure information to a user to enable installation of the selected device driver.

\* \* \* \* \*